United States Patent
Jeng et al.

(10) Patent No.: US 11,964,428 B2
(45) Date of Patent: Apr. 23, 2024

(54) BOTTOM PLATE OF RESIN TANK FOR THREE-DIMENSIONAL PRINTING

(71) Applicant: National Taiwan University of Science and Technology, Taipei (TW)

(72) Inventors: Jeng-Ywan Jeng, Taipei (TW); Ming-Hua Ho, Taipei (TW); Ping-Hsun Tsai, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 16 days.

(21) Appl. No.: 17/692,154

(22) Filed: Mar. 10, 2022

(65) Prior Publication Data
US 2023/0080633 A1  Mar. 16, 2023

(30) Foreign Application Priority Data
Sep. 3, 2021  (TW) .................................. 110132715

(51) Int. Cl.
| | |
|---|---|
| *B29C 64/245* | (2017.01) |
| *B29C 64/124* | (2017.01) |
| *B29C 64/255* | (2017.01) |
| *B33Y 30/00* | (2015.01) |

(52) U.S. Cl.
CPC .......... *B29C 64/245* (2017.08); *B29C 64/124* (2017.08); *B29C 64/255* (2017.08); *B33Y 30/00* (2014.12)

(58) Field of Classification Search
CPC ... B29C 64/245; B29C 64/124; B29C 64/255; B33Y 30/00; G02B 1/18; C03C 2217/76
See application file for complete search history.

(56) References Cited

U.S. PATENT DOCUMENTS

| | | | | |
|---|---|---|---|---|
| 5,208,111 A | * | 5/1993 | Decher | B82Y 10/00 156/278 |
| 6,783,704 B1 | * | 8/2004 | Anthes | G02B 1/18 106/605 |
| 2014/0290732 A1 | * | 10/2014 | Aizenberg | A61L 33/064 427/299 |
| 2019/0358902 A1 | * | 11/2019 | Slaczka | B29C 64/245 |
| 2022/0212362 A1 | * | 7/2022 | Zhang | C04B 35/505 |

* cited by examiner

*Primary Examiner* — Jerzi H Moreno Hernandez
*Assistant Examiner* — Baileigh Kate Darnell

(57) ABSTRACT

The present invention provides a bottom plate of a resin tank for three-dimensional printing, which is manufactured through the following steps: substrate surface roughening step: treating the upper surface of a transparent substrate by using a plasma, or disposing a composite film on the upper surface of the transparent substrate to form a non-smooth surface structure having pores; substrate surface modification step: sequentially performing an activation treatment and a fluorination treatment on the upper surface of the transparent substrate; and stabilizer filling step: applying a stabilizer to the upper surface of the transparent substrate to fill the stabilizer penetrates into the pores on the upper surface of the transparent substrate. The low surface energy film reduces the adhesion of the hardened photosensitive material, and the stabilizer maintains the structure of the low surface energy film, so that the resin tank bottom plate has both oleophobic and hydrophobic properties.

6 Claims, 9 Drawing Sheets

BOTTOM PLATE OF RESIN TANK FOR THREE-DIMENSIONAL PRINTING

CROSS REFERENCE TO RELATED APPLICATIONS

The present application claims the benefit of Taiwanese Patent Application No. 110132715 filed on Sep. 3, 2021, the contents of which are incorporated herein by reference in their entirety.

BACKGROUND OF THE INVENTION

1. Technical Field

The present invention relates to a bottom plate of resin tank for three-dimensional printing, especially to a bottom plate of resin tank which is for reducing a drawing force of a photocurable material in a forming process.

2. Description of the Related Art

Stereolithography technology is divided into a top-down system and a bottom-up system. At present, large-scale production in the industry mostly uses the top-down system because there are fewer problems in enlarging the printing area, but the possibility for increasing the vertical lifting speed (for fast printing) is less. To speed up the manufacturing process of a product, the only way is to enlarge the printing area for increasing the output. The bottom-up system is generally used because of its best printing precision in multilayer manufacturing. However, it is still mostly applied to small area size printing due to limited and hardly to be increased in printing speed due to tensile stress that is occurred during detaching the printing layer from the bottom of the resin tank.

The tensile stress will be greatly increased with the increase of the printing area when a layer is separated from the base film. If the tensile stress can be reduced, the bottom-up system of stereolithography technology has a great possibility to be selected and used in a large-area manufacturing process and rapid mass production.

In order to solve the problem of too large bonding force between a hardened thin layer and a resin tank, in the bottom-exposure stereolithography, some processing parameters such as different thicknesses of silicone film, hydrophobic coating, Z-axis rise speed are used to reduce an adhesive force therebetween, and a separating force is measured by a load cell. The use of silicone is mainly due to low coefficient of elasticity of a silicone film, and thus, deformation is easily generated in the separation, resulting in back diffusion of the resin and reduction of the adhesive force.

However, a major breakthrough in the research on the separating force is made until 2015. Carbon3D Company published the Continuous Liquid Interface Production (CLIP) technology. In the CLIP technology, with a breathable film as the bottom of a resin tank, through the phenomenon in which the reaction of free radicals with oxygen is faster than the reaction of free radicals with a liquid resin, oxygen is input at the bottom into the liquid resin, and the oxygen input rate is controlled to determine the thickness of a dead zone where the liquid resin does not suffer from polymerization, such that a layer of the resin can be kept in a liquid state above the resin tank, thereby eliminating the phenomenon of local vacuum. Such a technology is quite surprising, but still there are some drawbacks as follows:

1. The entire surface of the breathable film is ventilated, so the suppression range cannot be controlled locally, and it is easy to increase the amount of dissolved oxygen in the material in the tank, resulting in a decrease in the conversion rate of the material.
2. Photosensitive resin that is easy to remain inactivated in the printed object.
3. Since the printing mechanism is using radical-type oxygen inhibition properties, it can only be applied to radical-type resins.

In addition, there is a technology that uses porous silicone as a substrate and adds silicone oil as a lubricant to make a self-lubricating film. The lubricant on the surface prevents the printed object from directly touching the underlying film, which is able to reduce the tensile stress of the underlying film. However, the density of the silicone oil used in this technology is very similar to the density of the printing resin, so the silicone oil is very easy to be taken away in a large amount during the printing process.

Furthermore, the Chinese Academy of Sciences used polyfluoroether liquid as the substrate in 2018, and used the polyfluoroether liquid to separate the bottom of the tank and the resin to achieve low tensile stress. However, because the substrate is liquid, it is easily affected by the lifting of the print during the printing process, which makes the surface of the printed object appear uneven and affects the appearance of the printed object.

Therefore, how to solve the above-mentioned problems and reduce the drawing force of the photocurable material in the forming process, the applicant, in view of the deficiencies in the prior study, through careful research, numbers experimentation and perseverance spirit, finally accomplished the present invention to solve the shortcomings of the prior studies.

SUMMARY OF THE INVENTION

In view of this, an objective of the present invention is to provide a bottom plate material of a resin tank for three-dimensional printing. By using a low surface energy film, the adhesion of the hardened photosensitive material is reduced, and by using a stabilizer, the structure of the low surface energy film is maintained. Thereby, the resin tank bottom plate has both oleophobic and hydrophobic properties, which overcomes the tensile stress defects of current bottom-up 3D printing technology.

In other words, the present invention provides a bottom plate of a resin tank for three-dimensional printing, which is able to reduce a drawing force of a photocurable material in a forming process and is manufactured through the following steps: substrate surface roughening step: treating the upper surface of a transparent substrate by using a plasma, or disposing a composite film on the upper surface of the transparent substrate to form a non-smooth surface structure having pores; substrate surface modification step: sequentially performing an activation treatment and a fluorination treatment on the upper surface of the transparent substrate; and stabilizer filling step: applying a stabilizer to the upper surface of the transparent substrate to fill the stabilizer penetrates into the pores on the upper surface of the transparent substrate.

According to one embodiment of the present invention, the stabilizer is a liquid with low mutual solubility for the photocurable material, and has viscosity in a range of 1 to 5000 cp, and the upper surface of the bottom plate of a resin tank has both hydrophobic and oleophobic properties.

According to one embodiment of the present invention, the substrate surface roughening step, the composite film comprises an adhesion layer and a main body layer; the adhesion layer is disposed on the upper surface of the transparent substrate, and the main body layer is disposed on the upper surface of the adhesion layer.

According to one embodiment of the present invention, the adhesive layer is formed by alternately stacking a plurality of cationic polymer layers and a plurality of anionic polymer layers; the main body layer is formed by alternately stacking a plurality of cationic polymer layers and a plurality of silica layers.

According to one embodiment of the present invention, in the substrate surface roughening step, the composite film is composed of silica and polydimethylsiloxane, which is formed on the upper surface of the transparent substrate by dipping or spraying.

According to one embodiment of the present invention, the weight ratio of the silica to the polydimethylsiloxane is in a range of 1:1 to 10:1.

According to one embodiment of the present invention, the silica is in the form of sol or particle.

According to one embodiment of the present invention, in the substrate surface modification step, the activation treatment comprises heating and oxidizing the transparent substrate at a high temperature, or treating the transparent substrate by using plasma.

According to one embodiment of the present invention, in the substrate surface modification step, the fluorination treatment comprises depositing fluoride on the upper surface of the transparent substrate by using a chemical vapor deposition method or an immersion method.

According to one embodiment of the present invention, after the stabilizer filling step, further comprising placing the transparent substrate in a vacuum environment to remove the air in the pores on the upper surface of the transparent substrate.

DETAILED DESCRIPTION OF THE PREFERRED EMBODIMENTS

Figure 1:
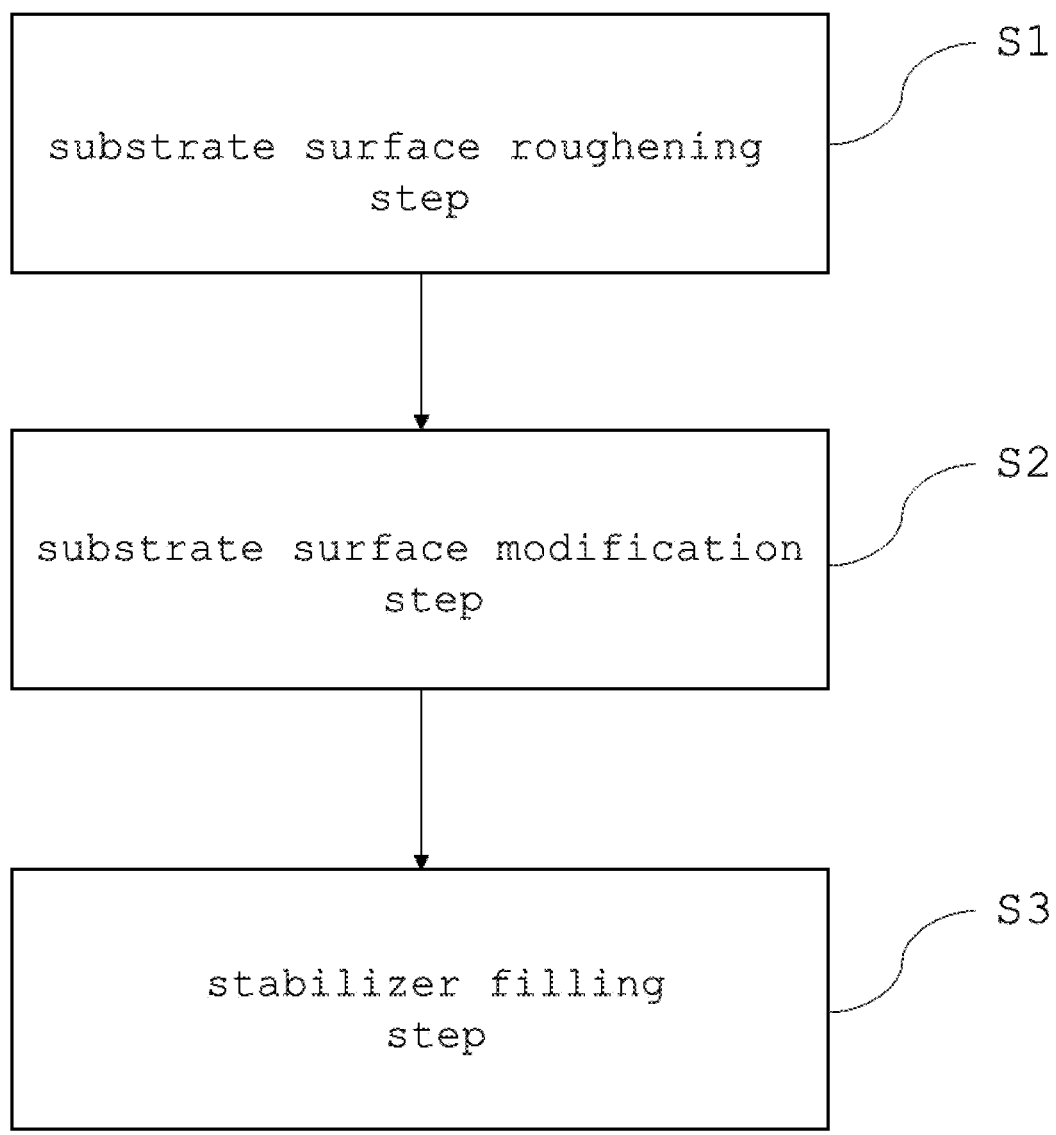
FIG. 1 shows a standard flow diagram of a method for the bottom plate of resin tank for three-dimensional printing of the present invention.

Hereafter, the embodiments of the present invention are described and illustrated in more detail by providing different specific examples, to make the spirit and content of the present invention be able to be understood more completely and easily. However, it should be appreciated by those ordinarily skilled in the art that the present invention of course is not limited to these examples, and the present invention can be achieved by using other identical or equivalent orders in functions and steps.

The above-mentioned and other technical contents, features, and effects of this invention will be clearly presented from the following detailed description of the embodiments in coordination with the reference drawings. Note that directional terms such as upper, lower, left, right, front or rear mentioned in the following examples are used to designate directions in the drawings to which reference is made. Thus, these directional terms are only used to illustrate, not limit the present invention, and the present invention can be achieved in any other manners.

The terms "drawing force" or "separating force" mentioned in the present invention means, after a photocurable material is carried by a substrate and is cured via illumination to form a 3D article, a force required to separate the 3D article from the substrate.

Please refer to FIG. 1, which shows a standard flow diagram of a method for the bottom plate of resin tank for three-dimensional printing of the present invention. The method comprises the following steps:

Substrate surface roughening step S1: treating the upper surface of a transparent substrate by using a plasma, or disposing a composite film on the upper surface of the transparent substrate to form a non-smooth surface structure having pores.

Substrate surface modification step S2: sequentially performing an activation treatment and a fluorination treatment on the upper surface of the transparent substrate.

Stabilizer filling step S3: applying a stabilizer to the upper surface of the transparent substrate to fill the stabilizer penetrates into the pores on the upper surface of the transparent substrate.

The transparent substrate used in the present invention is made of materials with good light transmittance, which is not particularly limited, preferably made of polymer materials with high light transmittance, or quartz glass, etc.

In step S1, forming a non-smooth surface structure with pores on the upper surface of a transparent substrate can reduce the surface energy of the transparent substrate, and the plasma treatment can directly modify the surface of the transparent substrate. In addition, a composite film can be provided on the transparent substrate by self-assembly coating with alternately stacked anion and cation, immersion coating, or spraying, to roughen the upper surface of the transparent substrate. The specific operation method will be described in the following examples.

According to a creative idea of the present invention, if the composite film is provided on the transparent substrate by self-assembly coating with alternately stacked anion and cation, the composite film is composed of an adhesive layer and a main body layer, and the adhesive layer and the main body layer arranged on the upper surface of the transparent substrate in sequence. That is, the adhesive layer is disposed on the upper surface of the transparent base material, and the main body layer is disposed on the upper surface of the adhesive layer.

The adhesion layer is formed by alternately stacking a plurality of cationic polymer layers and a plurality of anionic polymer layers; preferably, the numbers of layers of the cationic polymer layers and the anionic polymer layers are respectively 5 or more layers. In addition, the main body layer is formed by alternately stacking a plurality of cationic polymer layers and a plurality of silica layers; preferably, the number of the cationic polymer layers and the silica layers are respectively more than 15 layers.

In addition, according to the technical idea of the present invention, in the substrate surface roughening step, the composite film may also be composed of silicon dioxide (silica) and polydimethylsiloxane (PDMS). Silicon dioxide and polydimethylsiloxane are dissolved in a co-solvent to prepare a coating solution and then coated on the upper surface of the transparent substrate by dipping or spraying.

In the composite film, the ratio of the silicon dioxide to the polydimethylsiloxane (particle-binder ratio) is in a range of 3:1 to 10:1; preferably is in a range of 1:1 to 10:1; more preferably, is in a range of 3:1 to 8:1; more preferably, is in a range of 4:1 to 7:1.

In another embodiment of the present invention, the composite film is composed of particle materials that is other than silica and polydimethylsiloxane, such as micron, submicron, or nanoparticles with the size range of 10 nm-20 µm. The particle materials preferably have at least a chemical property that is not reacted with resin.

The particle materials suitable for the composite film of the present invention are illustrated but not limited as follows:

(1) Heavy metal particles, such as Ag, Au and the like;
(2) Metal oxide, such as ZnO, ITO, $TiO_2$, $Al_2O_3$, CuO, $Co_3O_4$, $CaCO_3$, $CeO_2$, $MoO_3$, $Fe_3O_4$ and the like;
(3) Hydrophobic polymers, such as polystyrene, cellulose nanocrystals, PTFE, fluoro-polymers and the like;
(4) Nano-carbon materials, such as carbon nanotubes, carbon nanofibers, etc.

The PDMS used in the present invention can be divided into two types: room temperature vulcanized silicone (RTV type) and thermally vulcanized silicone (HTV type), and thermally vulcanized silicone (HTV type) is preferred. Because RTV-type PDMS (Room Temperature Curing Silicone) has good transparency after configuration, it will continue to undergo vulcanization reaction after configuration, and gradually cross-link to produce precipitation.

The PDMS used in the present invention can be divided into two types: room temperature vulcanizied silicone (RTV type) and high temperature vulcanized (HTV) silicone (HTV type), and high temperature vulcanized (HTV) silicone (HTV type) is preferred. Even though RTV-type PDMS has good transparency after configuration, it will continue to undergo vulcanization reaction after configuration, and then chemical structure will the gradually crosslink to produce precipitation.

In addition, the particle size of the silica used in the present invention is in a range of 10 nm to 500 nm, and silica sol (initial particle size is 10-20 nm) or silica powder (initial particle size is about 70 nm) can be used. Among them, silica powder is better, because the particle arrangement on the surface of the composite film made of silica sol is relatively dense, resulting in lower air retention; while the surface of the composite film made of silica powder has more pores that can retain air.

Then, in the step S2, the activation treatment and the fluorination treatment are used sequentially to modify the surface functional groups of the transparent substrate to —$CF_3$, so that the surface the transparent substrate exhibits both hydrophobic and oleophobic properties. The activation treatment comprises heating and oxidizing the transparent substrate at a high temperature, or treating the transparent substrate by using plasma, so that the upper surface of the transparent substrate has super-hydrophilic properties before the fluorination treatment. The treatment temperature of the high-temperature oxidation treatment is generally 150° C. or more, preferably 300° C. or more, and more preferably 450° C. or more.

According to the technical idea of the present invention, the fluorination comprises depositing fluoride on the upper surface of the transparent substrate by using a chemical vapor deposition method or an immersion method. The modifier used in the fluorination treatment is a silane coupling agent, whose chemical formula can be expressed as: $R_4$-n$SiX_n$, (n=1-3), and X is usually an inorganic group which a methoxy group (—OMe), ethoxy group (—OEt), chloro (—Cl), etc.; in addition, the modifier can also be at least one selected from the group consisting of perfluorotrichlorosilane (PFOTS), perfluorooctanesulfonic acid (PFOA), perfluorodecyltrichlorosilane (PFDTS), perfluorodecane-1-thiol (PFDSH), perfluorodecyl acrylate (PFDAE); preferably at least one selected from the group consisting of perfluorotrichlorosilane (PFOTS), perfluorooctanesulfonic acid (PFOA), perfluorodecyltrichlorosilane (PFDTS); more preferably at least one selected from the group consisting of perfluorodecyltrichlorosilane (PFOTS), perfluorodecyltrichlorosilane (PFDTS).

Moreover, the low adsorption characteristics of air itself is often used to produce low surface energy in the low surface energy structure, but the air layer cannot permanently maintain its air retention under continuously pressure changes, especially in the down-illuminated light curing and forming process, the continuous stretching process of the printed object will allow the photosensitive resin to penetrate into the structure, which will be continuously destroyed layer-to-layer during photo-curing polymerization. Therefore, in step S3, the stabilizer is filled in the pores of the transparent base material, which can prevent the resin from slowly infiltrating into the air layer and causing damage during the molding process, and the air still remaining in the pore structure can be further evacuated by the vacuum device so that the stabilizer can be more completely fill the space.

The stabilizer is a liquid with low mutual miscibility for the photocurable material, for example, it can be silicone oil or perfluorocarbon. The perfluorocarbon can be at least one selected from the group consisting of perfluoroether, perfluorodecalin, perfluoromethyldecalin, perfluorohexane, perfluoromethylcyclohexane, perfluorodimethylcyclohexane, perfluoroheptane, perfluorooctane, perfluorononane, and perfluoromethylcyclopentane.

In addition, the viscosity of the stabilizer is generally in a range of 1 to 5000 cp, and the best is in a range of 100 to 1000 cp.

Hereafter, the present invention is described in more details by means of examples respectively.

Substrate Surface Roughening Step

Example 1 (Self-Assembly Coating by Alternate Stacking Anion and Cation)

A glass substrate that was placed in an ultrasonic machine and shaken to clean it for 5 minutes is used.
Adhesion Layer Formation Step:

The cleaned glass substrate was immersed in a cationic polymer solution (poly(allylamine hydrochloride) with a concentration of 0.01 wt % and pH value of 4 for 5 minutes. Then, the glass substrate was immersed in an ultrapure water to rinse its surface for 3 times. Further, the glass substrate was immersed in an anionic polymer solution (Poly(sodium 4-styrenesulfonate) with a concentration of 0.01 wt % and pH 7.5) for 5 minutes. The above-mentioned procedure is repeatedly 5 times in total to complete the preparation of an adhesion layer and thereby a glass substrate with adhesive layer was obtained.

Main Body Layer (Top Layer) Formation Step:

The glass substrate with the adhesive layer was immersed in a cationic polymer solution for 5 minutes. Then, it was immersed in ultrapure water to rinse a surface of the adhesion layer for 3 times, and subsequently immersed in different concentrations of $SiO_2$ solutions (0.01 wt %, 0.03 wt %, 0.05 wt %) for 5 minutes. The above-mentioned procedure was repeatedly 15 times to complete the preparation of a finished product with main body layer (top layer) formed on the adhesive layer.

The finished product was observed with naked eyes. It is found that the transmittance of the finished product decreases with the increase in the concentration of $SiO_2$ particles. Even the concentration of the $SiO_2$ solution lower as 0.01 wt % is employed, the finished product still has sufficient visual transmittance. However, if the $SiO_2$ solution with concentration 0.05 wt % is employed, the surface of the finished product is turbid to be a state of white turbidity. By using the SEM inspection, it can be seen that the finished product is covered by $SiO_2$ particles having a particle size of about 15 nm on its surface, where among the $SiO_2$ particles, many voids that can hold air are found.

Example 2 (Glass Substrate Made by Dip Coating Method: RTV-PDMS Film)

First, the RTV-PDMS coating solution was prepared. The main polymer and curing agent of RTV-PDMS (supplier: Dow Corning; model: SYLGARD-184) were mixed to be a recommended ratio of 10:1, and then were added into the co-solvent IPA/Hexane (the ratio is 4:3) to prepare a PDMS solution with a concentration of 0.5 wt %. Further, the PDMS solution was dispersed by an ultrasonic homogenizer for 10 minutes. After confirming that there is no precipitation in the solution, add 2.3% sol-type $SiO_2$ was added into the solution and the solution was vibrated by an ultrasonic homogenizer for 10 minutes. Thereby the RTV-PDMS coating solution is obtain.

Next, a glass substrate that was placed in an ultrasonic machine and shaken to clean it for 5 minutes was used. Then the glass substrate was manually immersed the glass substrate in the RTV-PDMS coating solution for 1 minute and then taken out. The immersed glass substrate was put into a constant temperature oven at 60° C. for drying the the surface of the glass substrate and thereby the roughening glass substrate is obtained.

Example 3 (Glass Substrate Made by Dip Coating Method: HTV-PDMS Film)

First, the HTV-PDMS coating solution was prepared. HTV-PDMS (supplier: Momentive; model: SR355S) and co-solvent IPA/Hexane (the ratio is 4:3) were mixed for preparing a PDMS solution with a concentration of 0.5 wt %, and the PDMS solution was dispersed by for 10 minutes. After confirming that there is no precipitation in the solution, different weights of $SiO_2$ powders were respectively added into the solution. Further, the solution was shaken by a shaker for 2 minutes, and dispersed by an ultrasonic machine for 10 minutes. Thereby the HTV-PDMS coating solution is obtain.

Next, a glass substrate that was placed in an ultrasonic machine and shaken to clean it for 5 minutes was used. Then the glass substrate was dropped at a constant speed and immersed in the HTV-type PDMS coating solution for 1 minute. Later, lift the glass substrate was lifted at a constant speed. The above-mentioned procedure was repeatedly 1 time and then the glass substrate was place in a constant temperature oven at 60° C. for drying. Thereby the roughening glass substrate is obtained.

Example 4 (Glass Substrate Made by Spraying)

A glass substrate that was placed in an ultrasonic machine and shaken to clean it for 5 minutes was used. And an acrylic carrier was adhered to the surface of the glass substrate. Use a spray gun to Further, the HTV-type PDMS coating solution (the formula of the HTV-type PDMS coating solution is the same as in Example 3 mentioned above) was sprayed on the surface of the glass substrate with a Z-shaped path and a moving speed of about 50 mm per second. After the HTV-type PDMS coating solution was completely sprayed on the complete glass substrate, the glass substrate was placed in a cool place for drying and removing the solvent. Thereby the roughening glass substrate is obtained.

Substrate Surface Modification Step

Example 5 (Surface Activation-Treated with Atmospheric Plasma)

The roughened glass substrate was adhered to a heat-insulating brick, and was processed the surface activation by using atmospheric plasma with bow-shaped path scanning (electric power is 500 W, frequency is 27 kHz, nozzle moving speed is 25 mm/s, nozzle height from the substrate is 10 mm).

Plasma surface treatment has been widely used to modify the surface of hydrophilized Si substrates. In particular, oxygen is introduced as a reactive gas during the process. When the ionized gas bombards the surface of the silicon substrate, a complex free radical reaction process will be generated. The surface of the substrate will eventually form a Si—O—Si bond, and this bond will spontaneously react with moisture to form hydrophilic Si—OH bond.

Example 6 (Surface Activation—High Temperature Oxidation Treatment)

The roughened glass substrate was placed in a high-temperature furnace for heating; the heating parameters were four hours of heating time, two hours of constant temperature time, and then naturally dropped the temperature to room temperature. The target constant temperatures were room temperature (no heating), 150° C., 300° C., and 450° C.

Next, the atomic ratios of the silicon dioxide film coating on the glass substrate with different temperature treatments were analyzed by energy dispersive X-ray spectroscopy. The results are shown in Table 1.

TABLE 1

|  | Atomic Ratio (%) | | | |
| --- | --- | --- | --- | --- |
|  | C | O | F | Si |
| room temperature | 15.58 | 58.95 | −0.28 | 25.75 |
| 150° C. | 13.99 | 61.9 | 0.69 | 23.43 |
| 300° C. | 7.13 | 65.11 | 0.85 | 26.91 |
| 450° C. | 5.16 | 67.82 | −0.16 | 27.38 |

It can be seen from Table 1 above, the number of oxygen atoms increases slightly with the increase of the constant temperature and the number of carbon atoms obviously decreases with the increase of the constant temperature, indicating that the increase in temperature helps to remove organic matters on the surface of the glass substrate, and hydroxyl groups are generated.

It is speculated that the HMDS in the original $SiO_2$ surface is cracked due to high temperature oxidation during the heating process. In this way, if the organic matters in the $SiO_2$ surface is removed by this method, there is a chance to create more surface space that can be replaced with Si—O—Si bonds. As long as it is allowed to stand for a period of time in a space with sufficient humidity, the water vapor in the air can react with the surface of the material to produce a structured surface that activates —OH functional groups.

Example 7 (Fluorination Surface Treatment—Plasma Enhence CVD (PECVD))

The activated glass substrate was putted into the plasma chamber and processed vacuum radio frequency (RF) plasma treatment to deposit PFOTS under the conditions of 20 mTorr, 100 W voltage and 10 sccm oxygen flux for 1, 3, and 5 minutes. Then dripped deionized water on the surface of the glass substrate to confirm the treatment is finished. Thereby the modified glass substrate is obtained.

With this method, the incoming material can be ionized during the plasma process to reach an excited state, and can spontaneously bond with the surface of the glass substrate. If the parameters for depositing PFOTS on the surface of an unactivated glass substrate are under the conditions of a voltage of 100 W and an air flux of 10 sccm, it will be found that PFOTS will be cracked due to excessive energy during the plasma process, resulting in etching on the surface of the substrate, and the contact angle of the surface of the substrate will change to the hydrophilic state. It shows that the unactivated glass substrate is not suitable for preparing low surface energy interfaces.

Example 8 (Fluorination Surface Treatment—CVD)

The activated glass substrate was placed in a vapor deposition device, and the vapor deposition device was putted in a constant temperature oven at 60° C. for one hour.

After one hour, took the vapor deposition device out, opened the top cover of the vapor deposition device, put 60 μL of PFOTS in a petri dish under the glass substrate, and then put the vapor deposition device in a vacuum oven. Turn on the vacuum pump to pump the air below 10 Torr, and let it stand in the vacuum oven at 60° C. for six hours. Thereby the modified glass substrate is obtained.

Stabilizer Filling Step

Example 9

The modified glass substrate was installed and locked at the bottom of the resin tank, and then polyfluoroether (PFPE) was poured into the resin tank until polyfluoroether covers the upper surface of the glass substrate.

Then the resin tank was put in the vacuum chamber and evacuated the air in the vacuum chamber to be below 10 Torr and let the resin tank stand for one hour. Thereby the bottom plate of resin tank of the present invention is obtained.

Performance Analysis of Bottom Plate of a Resin Tank

Figure 2:
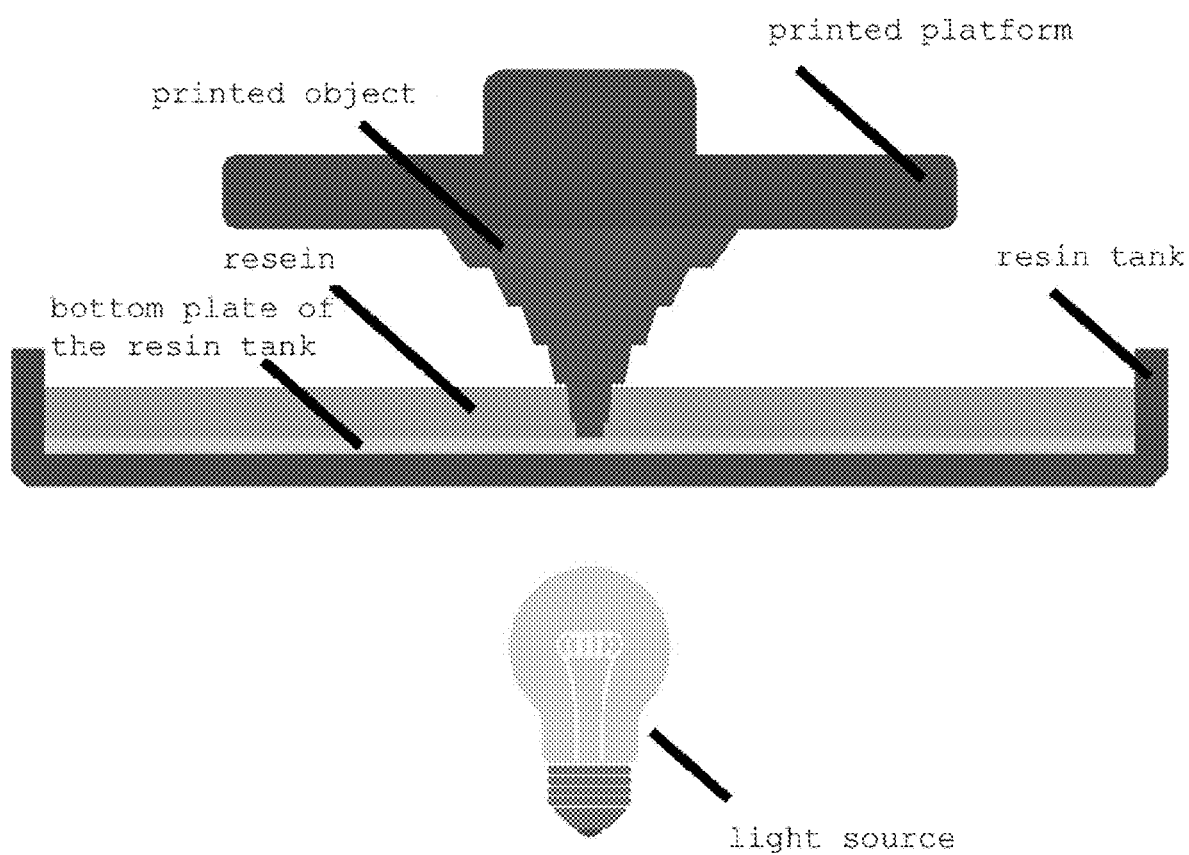
FIG. 2 is a schematic diagram showing the configuration of the 3D printing device in the performance analysis of bottom plate of a resin tank.

The three-dimensional printing device used in this invention can be assembled by itself or purchased from the market. As shown in FIG. 2, the three-dimensional printing device (bottom-up vat photopolymerization device) includes a resin tank, a projection light source, and a molding unit. The resin tank is used for containing photocurable materials and the bottom of which is light-transmissive. The projection light source is located under the resin tank, and can emit a light beam from bottom to top to the bottom of the resin tank and irradiate the photocurable materials. The photocurable materials can receive the corresponding light source wavelength to cure and mold. The molding unit includes a printing platform and a lifting mechanism which can move the printing platform down into the resin tank and make the printing platform move up and down relative to the bottom of the resin tank, so as to construct the finished product.

In addition, there were different materials of the bottom plate of the resin to analyze the difference in tensile stress during printing. The manufacturing methods of the bottom plates of each resin tank are as follows:

Resin tank 1 (hard Teflon bottom): A Teflon film with adhesive was adhered directly on the glass bottom plate.

Resin tank 2 (soft Teflon bottom): The whole edge of the Teflon film was tightened at the bottom of the resin tank, and there was no glass bottom plate underneath.

Resin tank 3 (PDMS bottom): The main polymer and curing agent of RTV-PDMS (supplier: Dow Corning; model: SYLGARD-184) were mixed at the recommended ratio of 10:1 and poured into the resin tank. Then kept it at 80° C. for 1.5 hours until cured.

Resin tank 4-(PDMS mixing inhibition material base (oxygen barrier film)): 5% tocopherol was added to the same PDMS and mixed evenly. Then the mixture was poured into the resin tan, and kept the mixture at 80° C. for 1.5 hours until cured.

Resin tank 5 (Resin tank bottom plate of the present invention): The HTV-PDMS coating solution (the weight ratio of $SiO_2$ to PDMS is 5:1) was sprayed on the surface of the cleaned glass substrate, then the high temperature oxidation treatment at 550° C. and the fluorination treatment with chemical vapor deposition method were performed on roughening glass substrate the to obtain the modified glass substrate, and finally filling the pores on the surface of the modified glass substrate with PFPE in a vacuum environment to obtain the finished product.

Resin tank 6 (PFPE with non-fluorinated surface (non-fluorinated film)): The HTV-PDMS coating solution (the weight ratio of $SiO_2$ to PDMS is 5:1) was sprayed on the surface of the cleaned glass substrate, then the high temperature oxidation treatment at 550° C. were performed on roughening glass substrate the to obtain the modified glass substrate, and finally filling the pores on the surface of the modified glass substrate with PFPE in a vacuum environment to obtain the finished product.

Resin tank 7 (PFPE liquid bottom): PFPE was poured directly into the tank in a quantitative amount.

The above-mentioned resin tanks 1 to 7 were used to print mesh structures with holes and solid cubes respectively, and the printing parameters and conditions were the same. The resin material used is acrylic resin light-curing resin (Supplier: PHROZEN TECH CO., LTD., Model: Phrozen Gray)

Printing methods can be divided into general printing and continuous printing, the description is as follows:

1. General printing: Generally, the light source is turned off after each layer is exposed. In order to print the lower layer graphics, it must be lifted up to a certain height at this time. The purpose of this action is to be able to depart from the bottom of resin tank. During exposure, the photosensitive resin will generate resin adhesion force and vacuum adsorption force with the bottom of resin tank, so the printing platform must be raised to a certain height until the tensile stress is completely broken before the printing platform is lowered again, and when the printing platform is lowered, one layer of height must be reserved so that the exposure of the lower layer can keep continuing. Since this lifting action is to break the tensile stress, if the lifting speed is too fast, the cured resin that has not been converted to a certain strength will be destroyed. And every layer needs to be lifted and lowered, so it often takes more than half of the total printing time. Almost on the market, the bottom-up VP device is used this printing method. Since the total printing time is quite long, it can only be used in small studios.

2. Continuous printing: It does not need to turn off the printing light source during the printing platform is raised. Therefore, the printing parameters can remove the number of illumination seconds and many unnecessary settings. In addition, the illumination and the movement of the printing platform are performed at the same time during the printing process, which will save the stagnation time of the printing platform and reduce the delay time for communication between the software and firmware. However, due to the lack of time when the light source is turned off in general printing, the force between the base films of resin tank and the printed object may be too high, so most base films and resins for general printing cannot be printed in this way. This continuous printing method can only be used on a bottom plate of the resin tank with lower drawing stress.

Next, the following describes the analysis results of general printing and continuous printing using the above-mentioned resin tanks 1 to 7.

1. The Printed Object is a Mesh Structure with Holes

When the printed object is a mesh structure, the cross-sectional area of printed object contacted with the bottom of the resin tank is less. Further, compare to the solid substrate, the unexposed uncured resin can flow back more smoothly to fill the gap when the printing platform is pulled up along the Z axis. Therefore, not only the tensile stress is relatively smaller, but also the chance of bubbles being embedded during printing is much reduced.

A. General Printing (Printed Object Size is 10×10×30 mm)

Figure 3:
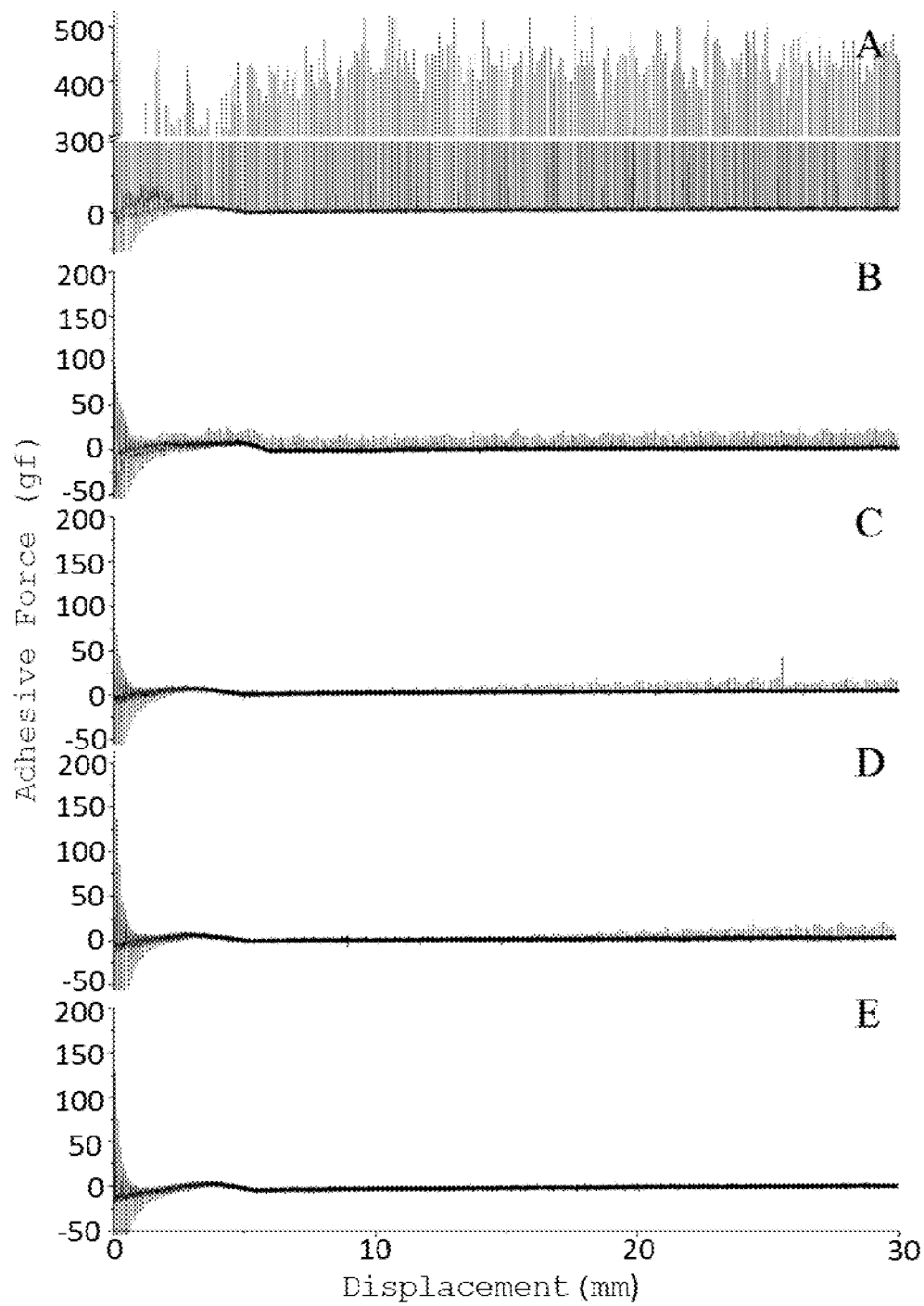
FIG. 3 shows a graph of tensile stress values of the printing platform which is pulled up after the exposure is measured by the load cell when printing the mesh structure object with the general printing method respectively using the resin tanks 1 to 7 in the performance analysis of bottom plate of a resin tank.

Please refer to FIG. 3, which shows the tensile stress value of the printing platform which is pulled up after the exposure is measured by the load cell when printing the mesh structure object with the general printing method respectively using the resin tanks 1 to 7.

It can be clearly observed from FIG. 3 that the tensile stress on the hard Teflon bottom (Resin tank 1, Curve A in FIG. 3) is much larger than other tank bottom materials, and the average tensile stress is between 400 gf and 500 gf. Because the hard Teflon bottom has a glass bottom plate, there is no deformation on its bottom surface when stressed, that is to say, only Teflon, which has relatively low surface energy, cannot produce good desorption ability by itself. If the hard glass bottom plate is removed and printed with the same Teflon material (Resin tank 2, Curve B in FIG. 3), the tensile stress drops from the average 400 gf-500 gf to 20 gf-40 gf immediately, leaving only 5% tensile stress. It can be seen that the slight deformation of the bottom film (soft Teflon bottom) under tension can significantly improve the viscous force of the material (resin). It is speculated that the vacuum adsorption force of the material is easier to break during the deformation process of the bottom film.

If the bottom plate is replaced with pure PDMS bottom (Resin tank 3) or oxygen barrier film (Resin tank 4), although the tensile value has a gradual upward trend, it is less than 10 gf within the printing height of 30 mm. The slight difference is that the tensile stress of pure PDMS starts to increase gradually after the printing height is greater than 10 mm (Curve C in FIG. 3); while the tensile stress of the oxygen barrier film starts to increase gradually after the printing height is about 15 mm to 20 mm (Curve D in FIG. 3). It can be inferred that PDMS has low surface energy, elastic deformation and sufficient resilience characteristic, so PDMS can effectively reduce the tensile force by its own surface characteristics and slight deformation at the beginning of printing.

After printing by using the PDMS bottom (Resin tank 3) for a period of time, PDMS will cause hysteresis in polymer fatigue due to the accumulation of stress. When the ability of slight deformation of the PDMS bottom is gradually reduced, the force on the load cell will gradually increase after printing for a period of time. On the other side, for the oxygen barrier film, it can be found that the oxygen barrier film can prolong the low stress time more than pure PDMS. It is speculated that the inhibitor material in the oxygen barrier film can deprive the free radicals cracked by the photoinitiator, effectively reducing the conversion rate of the photopolymerization resin in contact with the film, and therefore the tensile stress on the base film can be further reduced.

In addition, the experimental results of the bottom plate of the present invention (Resin tank 5) indicate that the bottom plate can maintain a relatively low tensile force during the entire printing process, and there is no increase in the force like other experimental groups, which shows that the ultra-smooth film in the bottom plate of the present invention can not only reduce the adhesive force of the resin material, but also improve the vacuum adsorption force in a process that does not require deformation (Curve E in FIG. 3).

Further, for the non-fluorinated film (Resin tank 6), since the printed object adheres to the bottom of the resin tank after printed to five layers, it can be inferred that the low surface energy property plays an important factor in the release process. Even with there is low activity PFPE as a stabilizer in the non-fluorinated film, the printed object cannot be departed from the bottom of the resin tank smoothly, causing the photosensitive resin to adhere to the bottom and be unable to print (not shown in Fig.s).

B. Continuous Printing (Printed Object Size is 10×10×30 mm)

With the same printing device and printing structure as the above-mentioned general printing, only the printing mode was changed to continuous printing. From the results, it is found that the printed object cannot be smoothly released from the bottom of the resin tank and adhered to the molding platform by using the resin tank 1 (hard Teflon bottom) and the resin tank 2 (soft Teflon bottom). Therefore, the following experiments were only able to test the resin tank 3 (pure PDMS bottom), the resin tank 4 (oxygen barrier film) and the resin tank 5 (the bottom plate of the present invention) which can be separated from the printed object. In addition, resin tank 7 (PFPE bottom) was also used for comparison.

Figure 4:
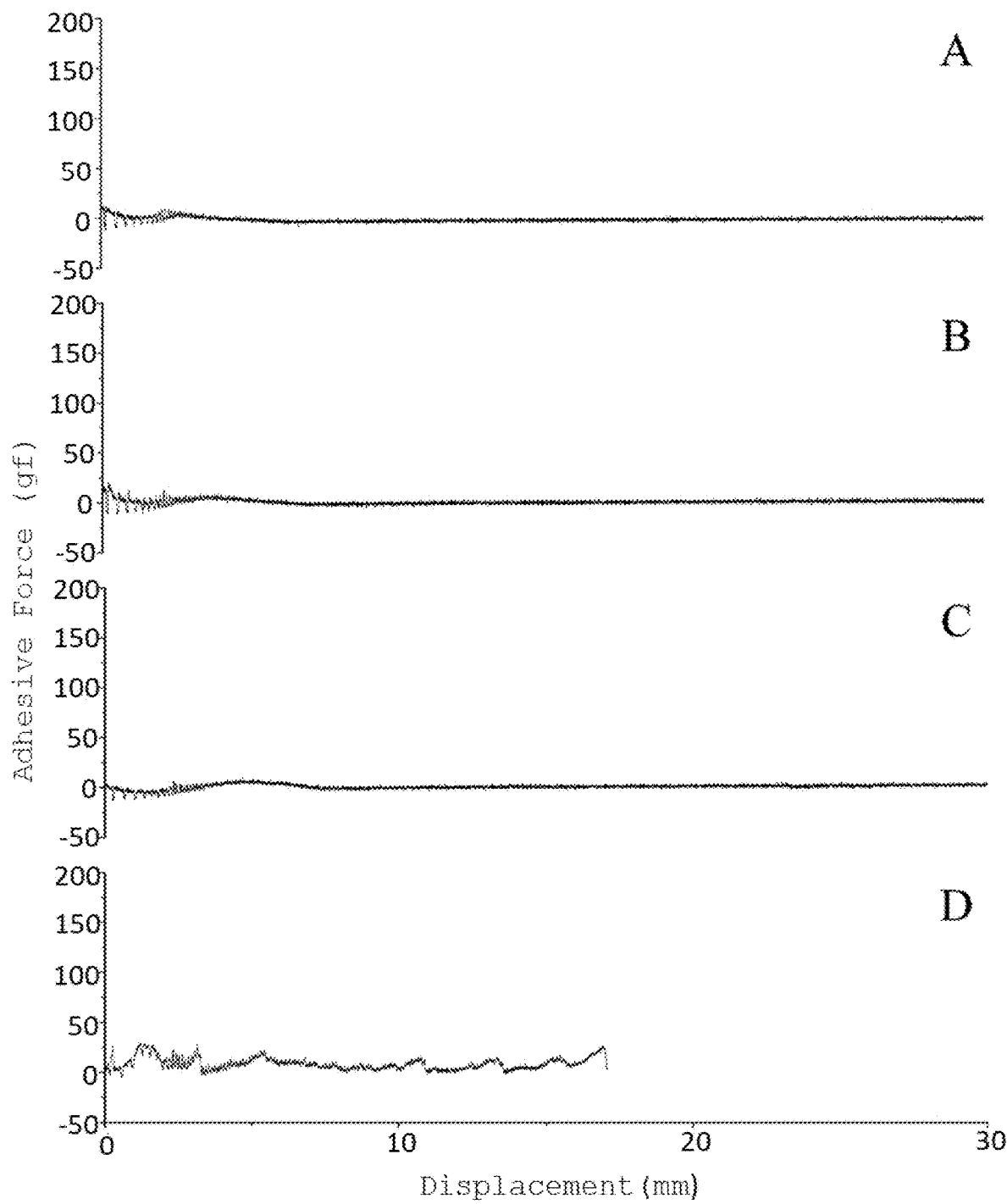
FIG. 4 shows a graph of the tensile stress values of the printing platform which is pulled up after the exposure is measured by the load cell when printing the mesh structure object (object size is 10×10×30 mm) with the continuous printing method respectively using the resin tanks 3-5, and 7 in the performance analysis of bottom plate of a resin tank.

Please refer to FIG. 4, which shows the tensile stress value of the printing platform which is pulled up after the exposure is measured by the load cell when printing the mesh structure object with the continuous printing method respectively using the resin tanks 3-5, and 7.

From the analysis results, it can be clearly found that for the resin tank 3 (pure PDMS bottom, Curve A in FIG. 4), the resin tank 4 (oxygen barrier film, Curve B in FIG. 4), the resin tank 5 (the bottom plate of the present invention, Curve C in FIG. 4) and the resin tank 7 (PFPE liquid bottom, F Curve D in FIG. 4), there are no significant differences in the tensile stress by using resin tanks 3-5. It is speculated that the print cross-sectional area is small and the material conversion rate is not high, so the tensile stress on the bottom of the resin tank is relatively small.

Compared with the results of general printing, it can be found that the tensile stress caused by continuous printing is lower. It is speculated that the effective light time of each layer of resin is low by continuous printing, and the resin thus maintains a high deformation force, resulting in a low tensile stress between the resin and the bottom of the resin tank. While printing continuously on top of PFPE liquid bottom (resin tank 7), it can be seen from the FIG. 4D that the curve line of tensile stress is steep and the printed object breaks at a printing height of 15 to 20 mm, which means that the bottom the resin tank that lacks support in the pure solution state is likely to have an insufficient stability problem.

C. Continuous Printing (Printed Object Size is 30×30×90 mm)

Since the cross-sectional area of the printed object with a size of 10×10×30 mm is small, and no significant difference was seen in the stress analysis by the load cell, in this embodiment, the size of the same printed object was enlarged three times under the size of 30×30×90 mm for testing.

Figure 5:
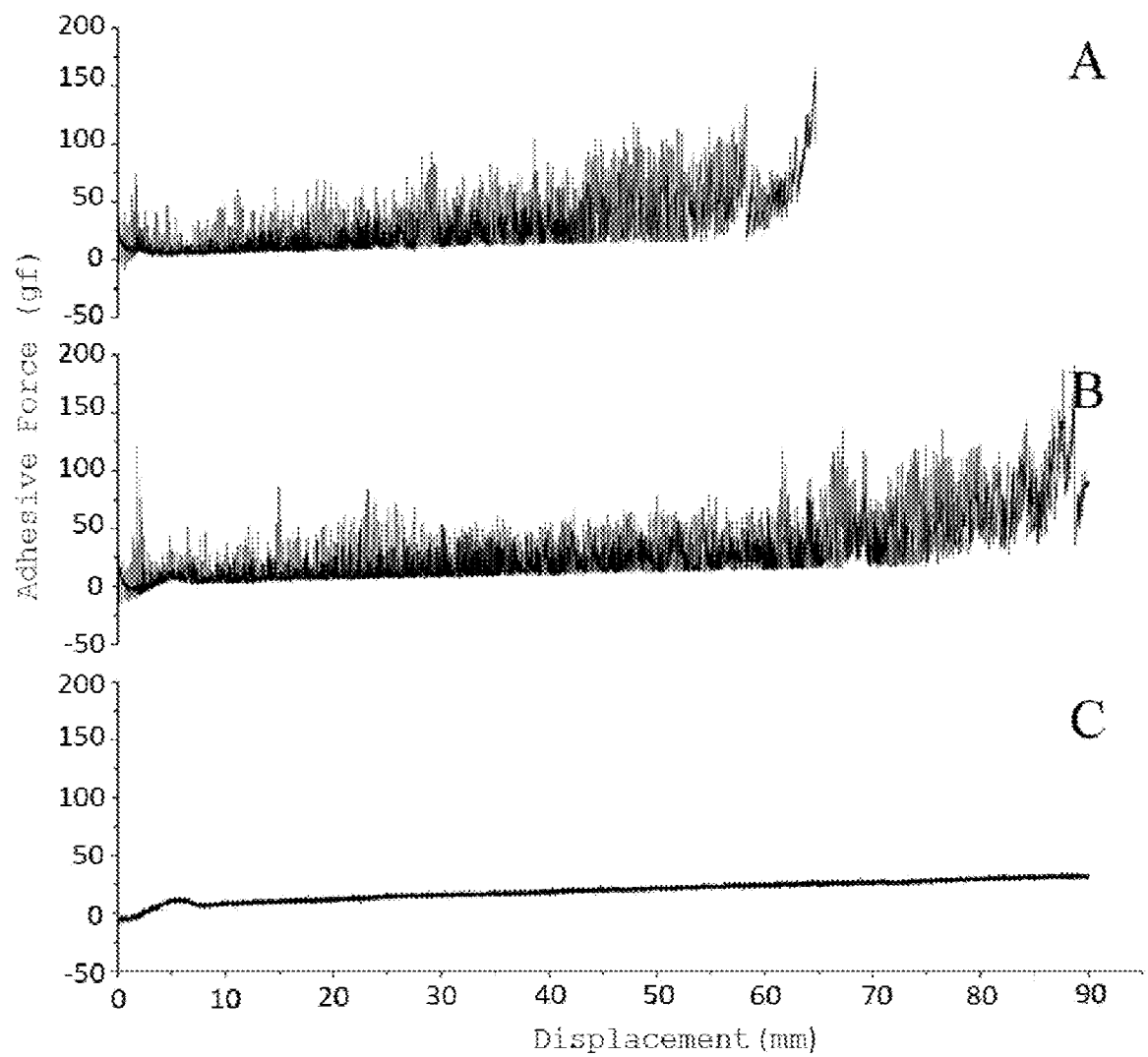
FIG. 5 shows a graph of the tensile stress value of the printing platform which is pulled up after the exposure is measured by the load cell when printing the mesh structure object (object size is 30×30×90 mm) with the continuous printing method respectively using the resin tanks 3-5 in the performance analysis of bottom plate of a resin tank.

Please refer to FIG. 5, which shows the tensile stress value of the printing platform which is pulled up after the exposure is measured by the load cell when printing the mesh structure object (object size is 30×30×90 mm) with the continuous printing method respectively using the resin tanks 3-5.

From the results shown in FIG. 5, it can be seen that the difference in the tensile stress of the bottom of the resin tank can be clearly measured when the object size is enlarged three times. It can be inferred that when the photosensitive resin material is exposed and pulled up, the magnification of the printed object, on the one hand, increases the contact area between the solid cross-section and the bottom of the resin tank to increase the total contact force. On the other hand, the reflow distance of the resin becomes farther, and the resin that is not affected by the light at the periphery cannot flow back to the central printing area for filling in real time, which makes conversion rate of the resin at the central area relatively high and is easy to cause the increase of tensile stress to damage the bottom of the resin tank.

When pure PDMS is used as the bottom of the resin tank (resin tank 3, Curve A in FIG. 5), the tensile stress rapidly accumulates from the print height of 5 mm to 10 mm and continues to increase. This is because the printing platform moves continuously along the Z axis during continuous printing, and it is necessary to move and depart from the bottom of the resin tank for the next layer of printing when the PDMS has not yet released the internal stress. This situation makes the printed object break when the height of the printed object gradually accumulates to about 65 mm. When the oxygen barrier film is used as the bottom of the resin tank (resin tank 4, Curve B in FIG. 5), a stress curve similar to that of PDMS bottom can be observed, but the printing time can be extended to a full printing height of 90 mm to the end, so it has been confirmed that the polymerization reaction of the suppression material on the bottom of the resin tank helps to reduce the tensile stress.

In addition, the bottom plate of the present invention (Curve C in FIG. 5) has a completely different tensile stress performance, and its load cell maintains a stable slope of force value. It is presumed that the weight of the printed object increases as the thickness of the printed object increases, but there is no significant tensile stress between the bottom of the resin tank and the cured resin. This low stress performance continues until the 90 mm structural object is printed, which means that the bottom plate of the resin tank developed by the present invention can fundamentally reduce the resin material adhesion problem, the printed product can be broken away from the bottom plate of the resin tank under low adhesion force, which also improves the influence of vacuum adsorption force.

D. Comparison of the Appearance of Printed Objects

Then the appearance of the finished objects printed by different printing methods were visually compared. For the printed objects by the general printing, there is no obvious difference in the printing performance, except that the upper surface of the printed object by using hard Teflon bottom (resin tank 1) has some traces of damage. As mentioned above, the force of hard Teflon bottom has a higher tensile stress, in the range of 400 gf to 500 gf, which easily damages the forming structure of thin-walled objects.

In continuous printing of a small size objects, the printed objects by using respectively the oxygen barrier film (resin tank 4) and the bottom plate of the present invention (resin tank 5) were printed completely in accordance with the sample drawings, but the printed object by using the PFPE liquid alone as the bottom of the printing tank (resin tank 7) could not be formed correctly. This is due to the stability of the pure liquid bottom layer is insufficient. In contrast, although the bottom plate of the resin tank of the present invention also contains PFPE liquid, PFPE is filled in the holes formed by many nano-sized particles, which can effectively reduce the PFPE liquid being drawn out due to the vacuum suction force, so the stability is obviously better than only PFPE liquid bottom.

Figure 6:
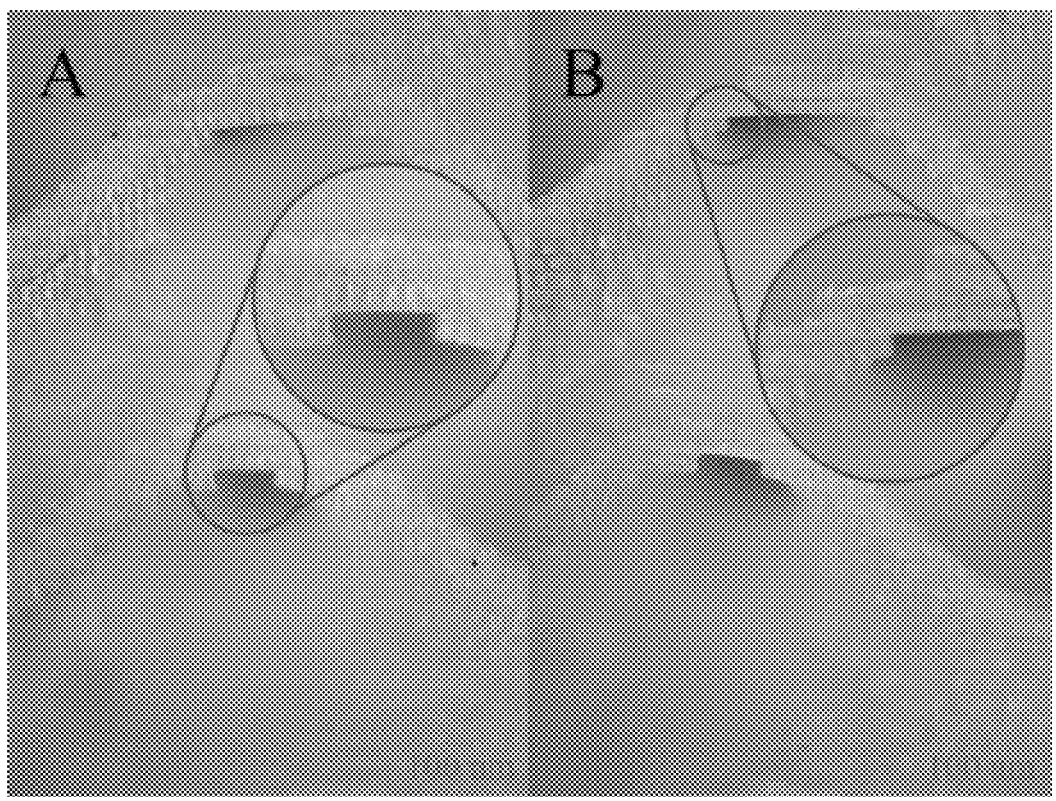
FIG. 6 shows enlarged photographs of the mesh structure objects by respectively using the resin tanks 1 and 5 in the continuous printing in the performance analysis of bottom plate of a resin tank in the performance analysis of bottom plate of a resin tank.

Next, the print quality of each printed object layer to layer along the Z-axis direction were observe by a microscope. While the original 3D sample drawings were sliced, they were not as smooth as the ideal sliced graphics, but were stacked with the smallest slice thickness, so there was a composition close to a right-angled structure. Here, compared the printed objects by using resin tank 1 (hard Teflon bottom, Picture A in FIG. 6) and resin tank 5 (the bottom plate of the present invention, Picture B in FIG. 6) in the general printing; as shown in FIG. 6, it can be observed from the microscope that the surface of the two printed objects have cut-to-layer patterns that are approximately 90° right-angled. Therefore, it can be judged that both resin tanks can be stabilized in the general printing method and the light source is correct.

Figure 7:
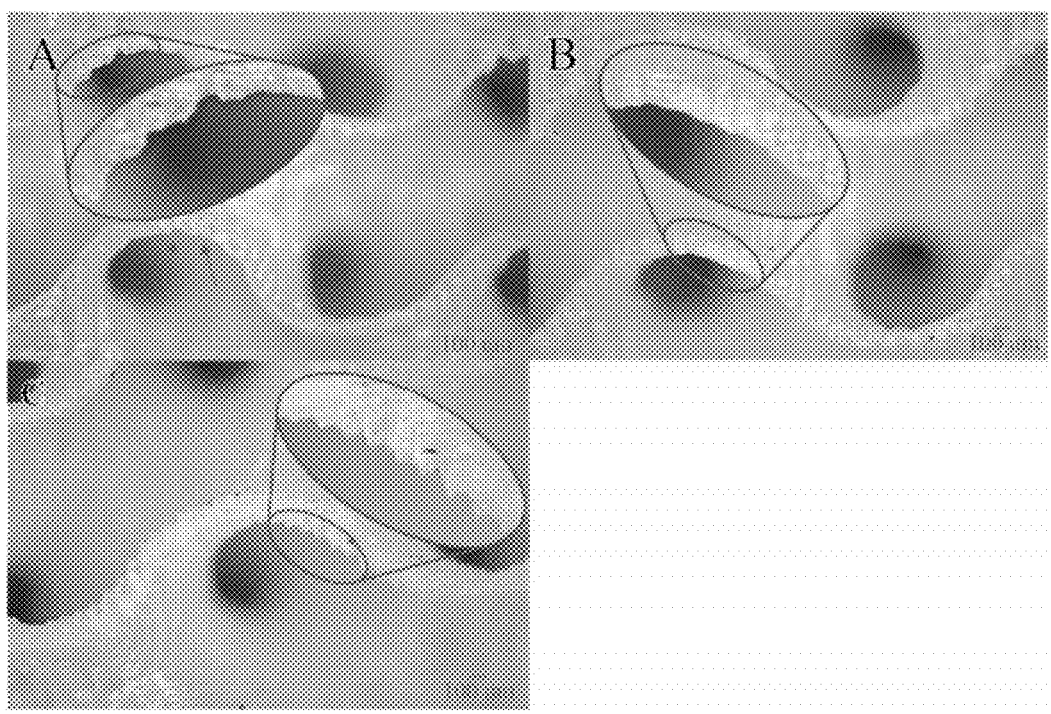
FIG. 7 shows enlarged photographs of the mesh structure objects by using the resin tank 5 (the resin tank bottom plate of the present invention) at the Z-axis stretching time from the shortest (A) to the longest (C) in continuous printing in the performance analysis of bottom plate of a resin tank.

Then the statuses of the printed objects in continuous printing were observe. The Z-axis stretching time was controlled by the motor delay time. The longer the motor delay time, the longer the Z-axis stretching time, which means that the resin material will take longer time to cure. FIG. 7 shows enlarged photographs of the mesh structure objects by using the resin tank 5 (the resin tank bottom plate of the present invention) at the Z-axis stretching time from the shortest (A) to the longest (C) in continuous printing.

It can be seen from Picture A in FIG. 7 that when printing the printed object with a short motor delay time of 250 μs, there will be longitudinal traces gradually being pulled apart between the layers, unlike the complete right angle state the printed object in FIG. 6. This section is called "transition section". The appearance of the transition section means that the resin material has not reached enough complete conversion or improper cross-linked state during printing. It is pulled up under the condition of insufficient structural strength, so stacking errors occur. When printing the printed object with a motor delay time of 500 μs (Picture B in FIG. 7), it can be clearly found that the printed layer pattern of the printed object has become smoother, and the diagonal graphics can be similar to the ideal 3D model slice. This smooth printing result is due to the fact that during continuous printing and cutting layers is from Nth layer to N+1th layer, if the platform moves at an appropriate speed, the right-angled part between the N+1th layer and the Nth layers can be filled into a smooth surface by exposing to the N+1th layer of penetration depth. This result will be able to obtain a better appearance of the printed object and reduce post-processing materials or grinding time. When printing the printed object with a longer motor delay time of 1000 μs (Picture C in FIG. 7), the appearance of the printed object returns to a layered stack structure, but its layer pattern is sharp, rather than the right-angle layer pattern in the general printing method. It is speculated that when the motor delay time is longer, the resin material will be exposed for a longer time, so the penetration depth will increase again, resulting in this layer pattern.

1. The Printed Object is a Solid Structure.

A. General Printing (Printed Object Size is 10×10×30 mm)

For printing a solid structure, compare with printing a porous structure, due to the large contact area between the solid structure and the bottom of the resin tank, the entire exposure area will generate a higher vacuum adsorption force when the printed platform is moved upwards. This vacuum adsorption force will cause a higher disturbance force at the moment when the printed object departs from the bottom of the resin tank and the vacuum is broken, resulting in a turbulent state when the resin material reflows and fills and the resin material is easy to be involved in part of the air or released the air contained in the resin material itself. Finally, the problem of bubble retention occurs, which is called "bubble retention phenomenon".

Figure 8:
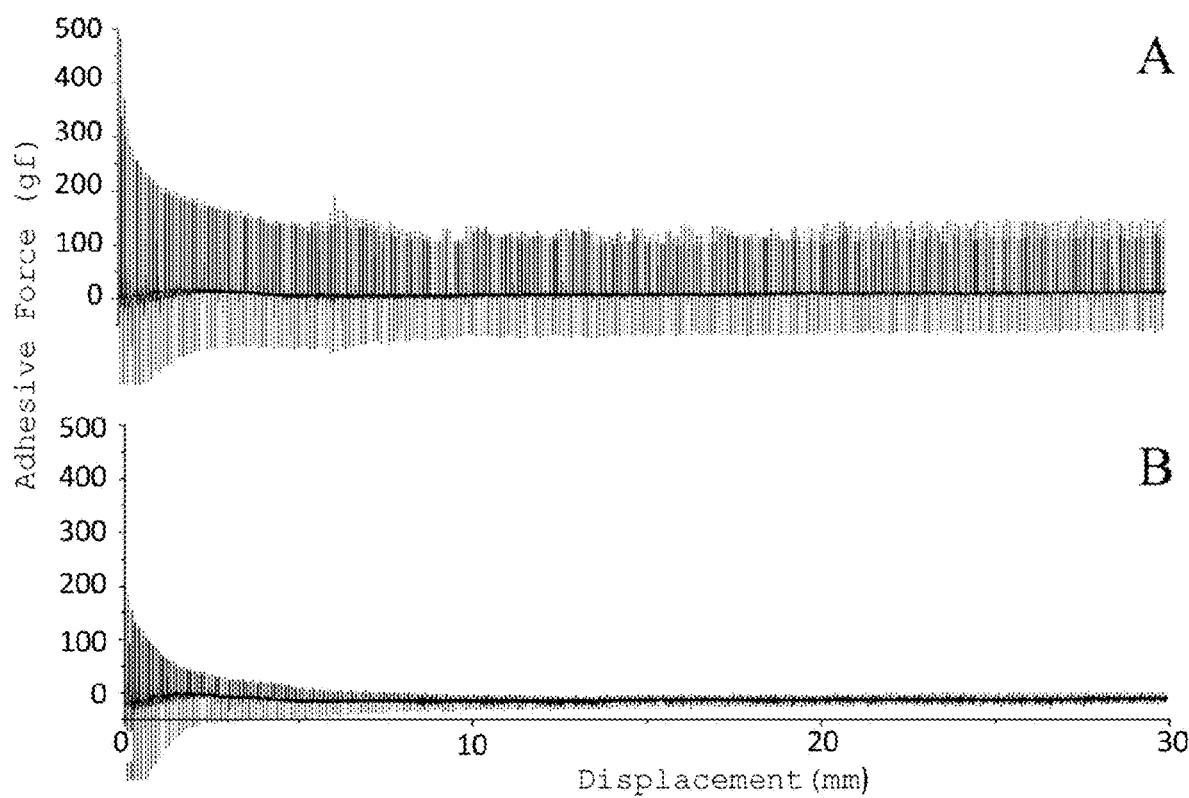
FIG. 8 shows a graph of the tensile stress value of the printing platform which is pulled up after the exposure is measured by the load cell when printing the solid structure with the general printing respectively using the resin tanks 4 and 5.

Please refer to FIG. 8, which shows the tensile stress value of the printing platform which is pulled up after the exposure is measured by the load cell when printing the solid structure with the general printing respectively using the resin tanks 4 and 5. As shown in FIG. 8, when printing a solid structure, the tensile stress value by using the resin tank 4 (oxygen barrier film) is approximately stable within 100 gf (Curve A in FIG. 8), and the tensile stress value by using the resin tank 5 (the bottom plate of the resin tank of the present invention, Curve B in FIG. 8) is close to 0 gf, which is also maintains a stable printing state.

B. Continuous Printing (Printed Object Size is 10×10×30 mm)

With the same printing device and printing structure as the above-mentioned general printing, only the printing mode was changed to continuous printing. Please refer to FIG. 9, which shows the tensile stress value of the printing platform which is pulled up after the exposure is measured by the load cell when printing the solid structure with the continuous printing respectively using the resin tanks 4 and 5.

Figure 9:
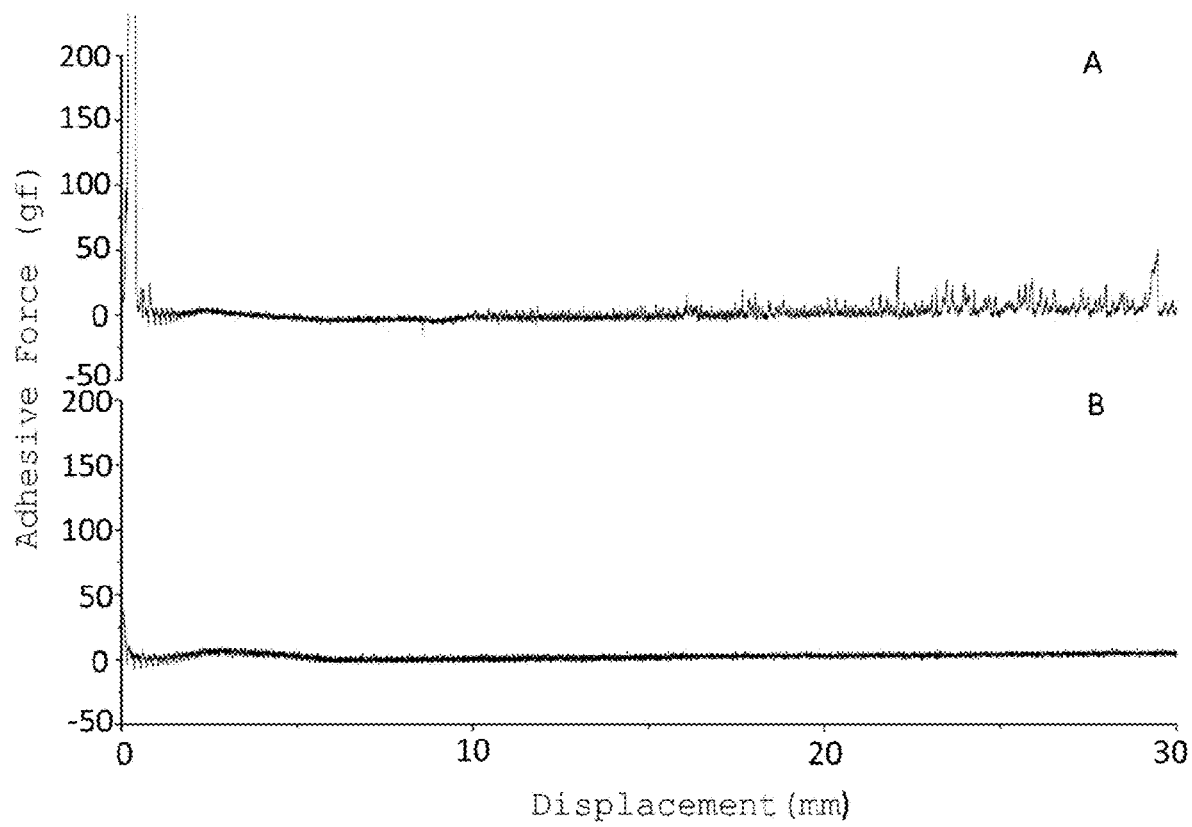
FIG. 9 shows a graph of the tensile stress value of the printing platform which is pulled up after the exposure is measured by the load cell when printing the solid structure with the continuous printing respectively using the resin tanks 4 and 5

As shown in FIG. 9, the printed object with a height of 30 mm can be completely printed by using the resin tank 4 (oxygen barrier film). However, the load cell starts to measure the instability trend when the printing height reaches 10 mm, and a large stress peak appears (Curve A in FIG. 9) when the height of the printed object is close to 30 mm, which is quite different from the case where the loading cell is not stressed when printing the mesh structure object. It is speculated that there are two reasons. On the one hand, the solid object will generate tensile stress on the entire contact surface of the bottom of the resin tank in the exposed area, unlike the mesh structure, which has some remaining unexposed areas that can cause the PDMS to stretch and deform, so the stress per unit area will rise a lot. Even if the bottom of the resin tank contains inhibitory materials, it will still reach deformation and fatigue early when the inhibitory effect is limited. On the other hand, the trapped air will also affect the flow of resin materials in the printing process, which will easily expose the resin materials around the air for a longer time, increase the conversion rate and may increase the tensile stress to cause damage to the bottom of the resin tank.

In contrast, observing the tensile stress diagram (Curve B in FIG. 9) during the process of printing a solid structure by using resin tank 5 (the bottom plate of resin tank of the present invention), the data curve is almost as smooth as when the mesh structure is printed. It is speculated that in addition to the low surface energy characteristics of the super-smooth film itself, the PFPE released from the base film is blocked between the printed object and the base film, making the tensile stress also approaching zero.

C. Comparison of the Appearance of Printed Objects

Then the appearance of the finished printed object printed by different printing methods were visually compared. It can be seen that the solid printed objects printed by the general printing can be completely printed by using the two resin tanks (resin tanks 4 and 5), and the layer patterns of each layer are clearly visible, indicating that if the bubble generation in the printing process can be eliminated, the layer-to-layer stacking of the printed objects can be formed correctly and completely.

However, in the case of printing solid objects by continuous printing, it can be seen that there are some slight differences between the printed objects by using the two resin tanks (resin tanks 4 and 5). The printed object using the oxygen barrier film (resin tank 4) has some small holes and separation of the printed layer, while the printed object using the bottom plate of the present invention (resin tank 5) has relatively larger holes but no separation of the printed layer. It can be inferred that the tensile stress of the oxygen barrier film (resin tank 4) in printing will damage the printed object, which not only causes the separation between layers and the forced pulling process also makes the poor stability between the film and the resin material. Because the printed object by using the bottom plate of the present invention (resin tank 5) does not generate significant tensile stress, it is speculated that the release of PFPE will cause the surface of the object to be damaged and produce larger holes. Therefore, even if no significant value is measured on the tensile stress, the PFPE in the ultra-smooth film will gradually be released due to the excessive vacuum adsorption force when printing solid objects, which will deposit on the bottom of the resin tank and even penetrate into the printed product to cause damage of the printed objects.

Compare the difference of the tensile stress and the appearance of the solid printed objects and mesh printed objects between using resin tanks with five kinds of bottom plates: hard Teflon bottom (resin tank 1), soft Teflon bottom (resin tank 2), pure PDMS bottom (resin tank 3), oxygen barrier film (resin tank 4) and the resin tank of the present invention (resin tank 5).

The difference in tensile stress value can be seen: hard Teflon bottom (resin tank 1)>>soft Teflon bottom (resin tank 2)>pure PDMS bottom (resin tank 3)>oxygen barrier film (resin tank 4)>bottom plate of the present invention (resin tank 5), wherein only the oxygen barrier film and the bottom plate of the present invention can completely print the mesh structure objects with a size of 10×10×30 mm by using the continuous printing process. And the bottom plate of the present invention further completes the entire printing with almost zero tensile stress, even if the printed object is enlarged to a size of 30×30×90 mm. It can be seen that the bottom plate of the present invention can effectively reduce the resin adhesion and vacuum adsorption force between the printed object and the bottom of the resin tank, and then greatly reduce the tensile stress.

In addition, regarding the printing of solid objects, the bottom plate of resin tank of the present invention improves the bubble retention phenomenon in general printing, so that it can also be applied to solid objects printing, and the appearance of solid objects can be correctly formed. From this result, it is confirmed that the bottom plate of the resin tank of the present invention has a wide range of applicability. For example, it can be used to print a mesh structure in a general and continuous printing process, while the bottom plate of the resin tank of the present invention can remove the bubble retention phenomenon, and then can print the solid objects by the general printing process, which overcomes the tensile stress problem of the stereolithography technology, and can maintain the quality stability of the finished product.

To sum up, the content of the present invention has been specifically described by means of examples in the above-mentioned embodiments; however, the present invention is not limited to these embodiments. It should be appreciated by those ordinarily skilled in the art that various variations and modifications can be made without departing from the spirit and scope of the invention; for example, all technical contents illustrated in the above-mentioned embodiments may be combined or changed into a new embodiment, and such embodiments are intended to fall within the scope of the invention. Thus, the scope of the application includes the scope defined in the appended claims.

REFERENCE NUMBERS

S1, S2, S3: Step

What is claimed is:

1. A bottom plate of a resin tank for three-dimensional printing, which is able to reduce a drawing force of a photocurable material in a forming process and is manufactured through the following steps:
substrate surface roughening step: disposing a composite film on the upper surface of a transparent substrate to form a non-smooth surface structure having pores;
substrate surface modification step: sequentially performing an activation treatment and a fluorination treatment on the upper surface of the composite film; and
stabilizer filling step: applying a stabilizer to the upper surface of the composite film to fill the stabilizer into the pores on the upper surface of the composite film under vacuum; wherein
in the substrate roughening step, the composite film comprises an adhesion layer and a main body layer; the adhesion layer is disposed on the upper surface of the transparent substrate, and the main body layer is disposed on the upper surface of the adhesion layer; the adhesive layer is formed by alternately stacking a plurality of cationic polymer layers and a plurality of anionic polymer layers and the main body layer is formed by alternately stacking a plurality of cationic polymer layers and a plurality of silica layers;
in the substrate modification step, the activation treatment comprises heating and oxidizing the composite film at 150° C. or more;
in the stabilizer filling step, the stabilizer is silicone oil or perfluorocarbon, and has a viscosity in the range of 1 to 5000 cp; and
the upper surface of the bottom plate of the resin tank has both hydrophobic and oleophobic properties.

2. The bottom plate of a resin tank for three-dimensional printing according to claim 1, wherein in the substrate modification step, the fluorination treatment comprises depositing fluoride on the upper surface of the composite film by using a chemical vapor deposition method or an immersion method.

3. A bottom plate of a resin tank for three-dimensional printing, which is able to reduce a drawing force of a photocurable material in a forming process and is manufactured through the following steps:
substrate surface roughening step: disposing a composite film on the upper surface of a transparent substrate to form a non-smooth surface structure having pores;
substrate surface modification step: sequentially performing an activation treatment and a fluorination treatment on the upper surface of the composite film; and
stabilizer filling step: applying a stabilizer to the upper surface of the composite film to fill the stabilizer into the pores on the upper surface of the composite film under vacuum; wherein in the substrate roughening step, the composite film is composed of silica and polydimethylsiloxane, which is formed on the upper surface of the transparent substrate by dipping or spraying;

in the substrate modification step, the activation treatment comprises heating and oxidizing the composite film at 150° C. or more;

in the stabilizer filling step, the stabilizer is silicone oil or perfluorocarbon, and has a viscosity in the range of 1 to 5000 cp; and the upper surface of the bottom plate of the resin tank has both hydrophobic and oleophobic properties.

4. The bottom plate of a resin tank for three-dimensional printing according to claim 3, wherein the weight ratio of the silica to the polydimethylsiloxane is in a range of 1:1 to 10:1.

5. The bottom plate of a resin tank for three-dimensional printing according to claim 3, wherein the silica is in the form of sol or particle.

6. The bottom plate of a resin tank for three-dimensional printing according to claim 3, wherein in the substrate modification step, the fluorination treatment comprises depositing fluoride on the upper surface of the composite film by using a chemical vapor deposition method or an immersion method.

\* \* \* \* \*